United States Patent [19]

Pohl

[11] 4,287,534
[45] Sep. 1, 1981

[54] METHOD AND SYSTEM FOR CREATING A GEOMETRIC FIGURE AT A SELECTED POSITION ON THE SCREEN OF A CATHODE RAY TUBE

[75] Inventor: Winfried Pohl, Büttelborn, Fed. Rep. of Germany

[73] Assignee: Robert Bosch GmbH, Stuttgart, Fed. Rep. of Germany

[21] Appl. No.: 100,257

[22] Filed: Dec. 4, 1979

[30] Foreign Application Priority Data

Dec. 13, 1978 [DE] Fed. Rep. of Germany ....... 2853675

[51] Int. Cl.$^3$ .............................................. H04N 5/22
[52] U.S. Cl. .................................................. 358/183
[58] Field of Search ........................................ 358/183

[56] References Cited

U.S. PATENT DOCUMENTS 4,121,253  10/1978  McCoy ............................... 358/183

Primary Examiner—Richard Murray
Attorney, Agent, or Firm—Frishauf, Holtz, Goodman & Woodward

[57] ABSTRACT

Method and apparatus for creating control signals which, when applied to a special effects mixer determine the shape and position of a geometric figure during a wipe transition. The control signals are formed by a combination of input signals synchronized to either the horizontal or vertical synchronization frequency and having amplitudes which vary as a predetermined function of time. A DC voltage having an amplitude corresponding to the setting of a potentiometer or variable resistor is inserted into at least one of the input signals and is preserved when the one input signal, such as a sawtooth signal is processed (squared) to create a second input signal (parabolic signal). The position of the figure on the screen changes with changing amplitude of the so-inserted DC voltage.

17 Claims, 3 Drawing Figures

METHOD AND SYSTEM FOR CREATING A GEOMETRIC FIGURE AT A SELECTED POSITION ON THE SCREEN OF A CATHODE RAY TUBE

CROSS REFERENCE TO RELATED APPLICATIONS AND PUBLICATIONS

Journal entitled "Technische Mitteilungen des RFZ," 22nd year, number 1, pages 4–7;
DAS No. 22 221 50;
DAS No. 24 567 45.

BACKGROUND OF THE INVENTION

In the journal called "Technische Mitteilungen des RFZ" 22nd year, number 1, pages 4–7 a method is described in which the figure which is to be wiped as a special effect is created by combining a plurality of input signal sequences, each having a predetermined variation with respect to time. The input signals are generated in so called function generators which are synchronized by either the horizontal or vertical synchronization signals. After the signals have been combined, they are applied to a voltage comparator. The size of the figure to be wiped can be adjusted by changing the limit at which the voltage comparator becomes effective. In order to adjust the position of the figure on the screen, continuously adjustable delay stages are provided which delay the input signals relative to the synchronization signal to which the function generator which generates it is synchronized.

This known method has the disadvantage that, when the position of the figure is adjusted past a particular edge of the screen, that portion of the figure which has been pushed past the edge will reappear at the opposite edge. In the German publication DAS Nos. 2222150 and 2456745 circuits are described which prevent this undesired appearance of the figure. However, these circuits in turn introduce another error. Specifically, shifting of the figure changes the boundaries of the region near the edge of the screen where limiting during a fadeover is masked, so that these boundaries are shifted into the picture area.

THE INVENTION

It is an object of the present invention to provide a method and system of the above-described type, wherein a shifting of the location on the screen of the figure will, under no circumstances, result in an undesired reappearance of the figure at another portion of the screen. It is a further object of the present invention, to eliminate the continuously adjustable delay members described above. Specifically, the change in position on the screen of the figure is to be effected by changing the amplitude of a DC signal. This type of adjustment lends itself particularly well to remote control.

In accordance with the present invention, a DC signal, specifically, a DC voltage, is added to the horizontally or vertically synchronized input signals which, after combination, result in the formation of the desired figure. The amplitude of the DC voltage is changed in correspondence to the setting of an adjustment element such as a potentiometer. The position of the figure on the screen will vary in correspondence to the amplitude of the DC component of the input signals and, therefore, in correspondence to the setting of the potentiometer.

In addition to accomplishing the above-mentioned objectives, the method and system of the present invention also result in greater stability of the position on the screen of the desired figure, while decreasing the number of building blocks and the need for matching components and/or building blocks. Also, the region over which the change in position may take place is increased and the figure on the screen can be modulated in the vertical direction as well as in the horizontal direction.

It should be noted that the term "geometric figure" in the context of this application is to be interpreted as meaning a figure of almost any desired shape as created by the combination of a plurality of input signals at least some of which have variations with respect to time which are geometric in nature, such as triangular shapes or parabolic shapes.

DRAWING ILLUSTRATING A PREFERRED EMBODIMENT

DESCRIPTION OF THE PREFERRED EMBODIMENT

Figure 1:
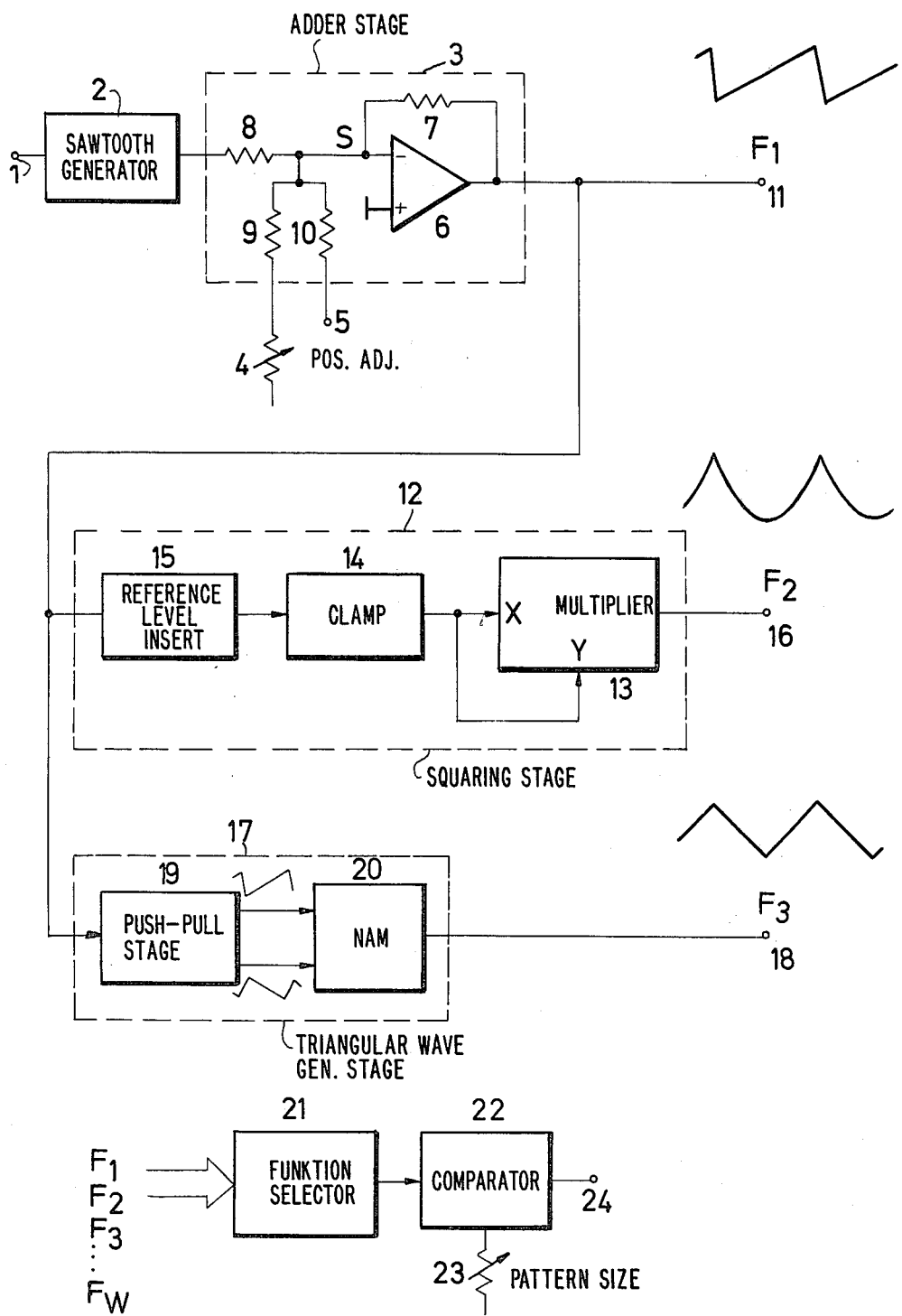
FIG. 1 is a block diagram of the system of the present invention.

In FIG. 1, a sequence of pulses of either the horizontal or vertical deflection frequency is applied at a terminal to a function generator 2. The output of function generator 2 is a sawtooth signal. Function generators of this type are well known and may, for example, comprise a capacitor which is charged through a constant current source and which is discharged by the pulse applied at terminal 1. The sawtooth signal appearing at the output of function generator 2 is applied to the input of an adder stage 3. Adder stage 3 has an additional input which receives a DC voltage whose amplitude may be adjusted by means of a variable resistor 4. A further input, 5, of adder stage 3 allows application of an AC signal, if required.

In the example illustrated in FIG. 1, the adder stage comprises a difference amplifier 6 whose inverting input is connected to its output through a resistor 7. The direct input of difference amplifier 6 is connected to ground potential so that circuit point S, namely the inverting input, is also at ground potential. Therefore any signal sources connected to circuit point S via resistors 8, 9 and 10 will not load each other.

A terminal 11 is connected to the output of adder stage 3. The signal at terminal 11 is a sawtooth signal $F_1$ whose DC level depends upon the setting of resistor 4 and whose variation with respect to time depends in part upon the AC signal applied to terminal 5. The frequency of sawtooth signal $F_1$ is synchronized to the signal applied to terminal 1. If the signal applied to terminal 1 is a signal of horizontal or line frequency, then the signal $F_1$ will be synchronized to the horizontal [or line] frequency. If the signal applied to terminal 1 is a pulse sequence of vertical deflection frequency, then the sawtooth signal $F_1$ will be synchronized to the vertical deflection frequency. The frequency of sawtooth signal $F_1$ may also be synchronized to a multiple or a sub-multiple of the frequency of the signal applied at terminal 1.

In a subsequent function generator 12, sawtooth signal $F_1$ is changed into a parabolic signal $F_2$. The main building block of function generator 12 is a multiplier circuit 13 which has two inputs, x, y, to both of which the sawtooth signal $F_1$ is applied. To stabilize the operating point of multiplier circuit 13, a clamping stage 14 is provided. During the blanking or retrace intervals, the clamping circuit clamps signal $F_1$ to a potential which has been previously keyed in in a reference pulse keying stage 15. A parabolic signal $F_2$ is available at output terminal 16 of function generator 12. The amplitude of signal $F_2$ varies as the square of the sawtooth signal including the DC component.

A function generator 17 changes signal $F_1$ to a triangular signal $F_3$ available at a terminal 18. As illustrated, function generator 17 includes a push-pull stage 19 and a nonadditive mixing stage 20 connected thereto. Function generator 17 will be described in greater detail with reference to FIG. 2.

Referring again to FIG. 1, the sawtooth, parabolic and triangular signals $F_1$, $F_2$, and $F_3$ in addition to other signals $F_4 \ldots F_n$ of either horizontal or vertical deflection frequency are applied to the inputs of a stage 21 which, by selection and subsequent combination of particular input signals creates an operator-selected figure or form. The signal at the output of stage 21 is applied to a comparator 22. The point at which comparator 22 starts to operate is determined by a variable resistor 23. The "size" of the figure selected in stage 21 therefore varies as a function of the setting of resistor 23. The bivalent signal at the output of comparator 22 constitutes a control signal for wipe transitions in a special effects mixer.

Figure 2:
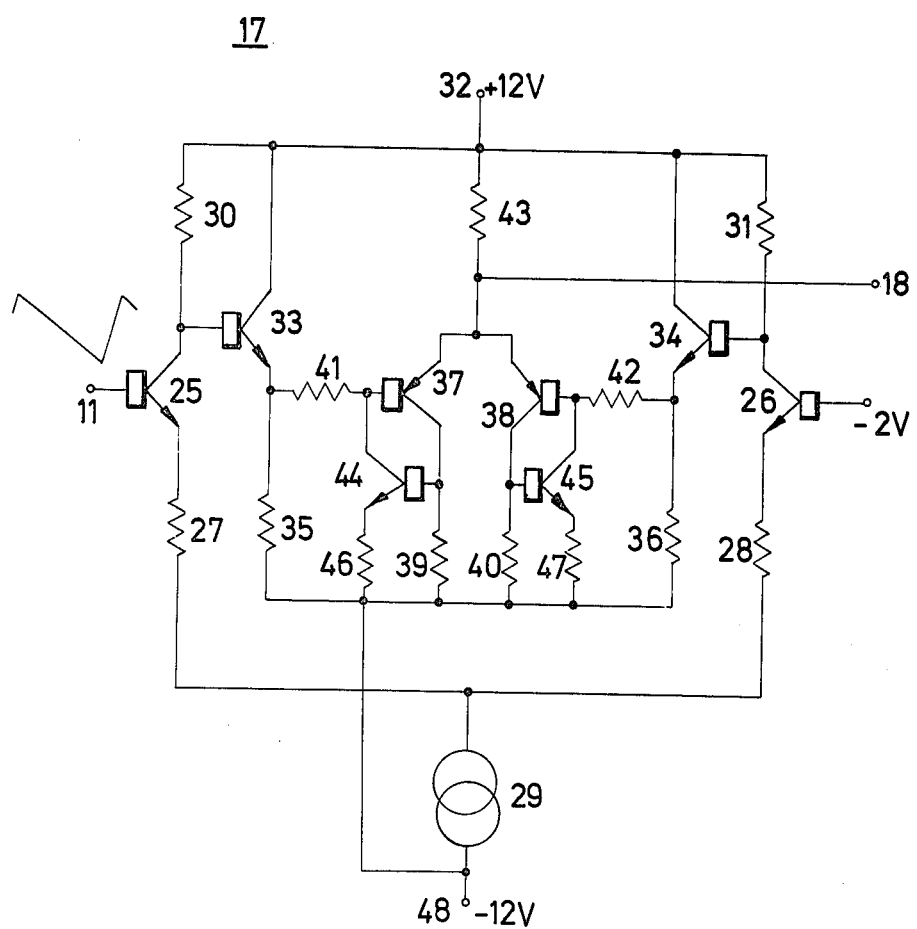
FIG. 2 is a schematic diagram of the circuit for generating a triangular signal.

Function generator 17, represented in FIG. 1 in block form, is shown in greater detail in FIG. 2. Push-pull stage 19 consists mainly of two transistors, 25 and 26. The emitters of transistors 25 and 26 are connected to each other through resistors 27 and 28. The common point of resistors 27 and 28 is connected to a constant current source 29. Sawtooth signal $F_1$ is applied to the base of transistor 25. A constant potential is applied to the base of transistor 26. The collectors of transistors 25 and 26 are connected through resistors 30 and 31, respectively, to a positive voltage source (terminal 32). Two sawtooth signals of opposite polarity are available at the collectors of transistors 25 and 26. The signal at the collector of transistor 25 is applied to the base of a transistor 33 which is connected as an emitter-follower. Similarly, the voltage at the collector of transistor 26 is applied to the base of a transistor 34, also connected as an emitter-follower. The emitters of transistors 33 and 34 are, respectively, connected to the negative voltage source through resistors 35 and 36. The outputs of the emitter-follower stages are applied to the inputs of a nonadditive mixing stage which includes transistors 37 and 38 as well as resistors 39, 40, 41, 42 and 43. Nonadditive mixing stages as such are known. Their operation therefore will not be described in detail. However, two transistors, 44 and 45, are also provided to improve the switching speed. Specifically, the collector of transistor 44 is connected to the base of transistor 37, while the collector of transistor 45 is connected to the base of transistor 38. The bases of transistors 44 and 45 are connected to the collectors of transistors 37 and 38, respectively. Finally, the emitters of transistors 44 and 45 are connected through resistors 46 and 47, respectively, to the negative supply terminal (terminal 48).

Figure 3:
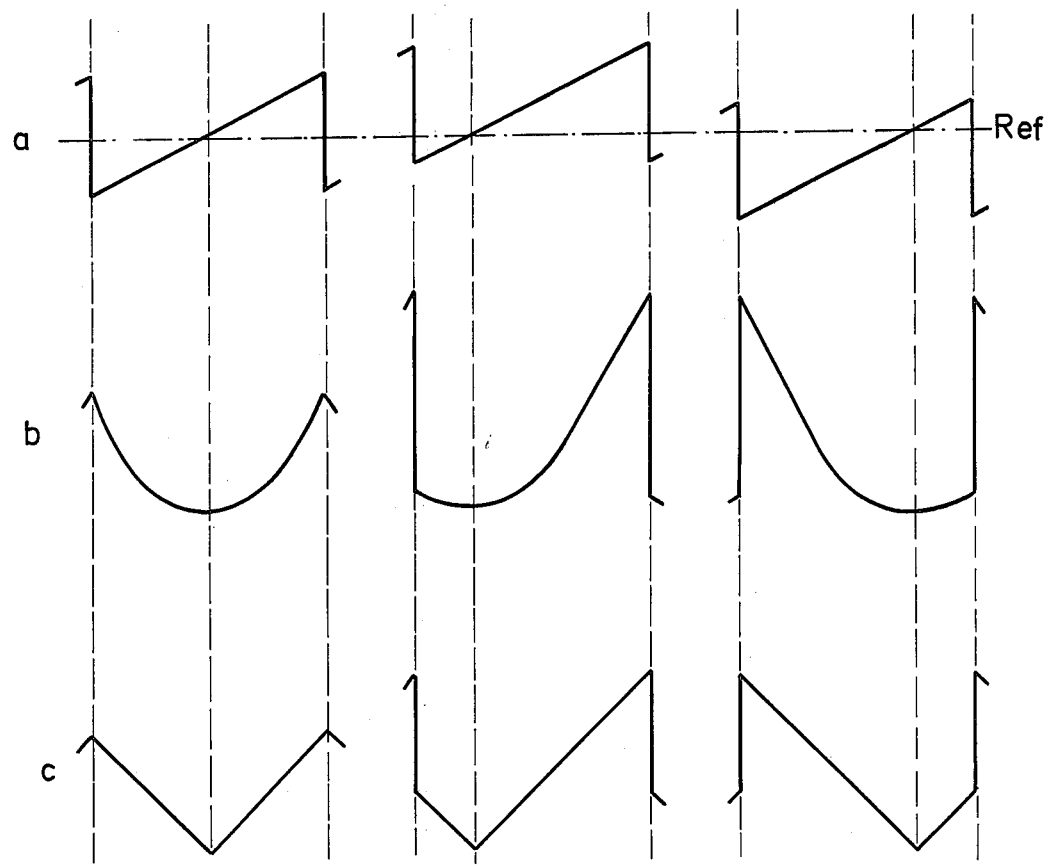
FIG. 3 is a set of voltage vs. time diagrams for explaining the function of the block diagram of FIG. 1.

In the voltage vs. time diagrams of FIG. 3, individual periods of signals $F_1$, $F_2$ and $F_3$ with different DC levels generated as described above are shown. A sawtooth signal symmetrical relative to the DC level is shown in line a on the lefthand side. In the middle of line a, a sawtooth signal having a DC level exceeding the DC reference level is shown, while on the rightmost side the DC level of the sawtooth signal is less than that of the reference value. By squaring the signals shown in line a, the signals in line b are derived. It will be noted that they are all parabolic signals, but that the position of the vertex varies as a function of the DC level, that is the level set with the aid of resistor 4 of FIG. 1. The same is true for the triangular shape signal shown in line c. Again, depending upon the DC level set by resistor 4, the most negative point within any one period of the triangular signal is shifted either to the right or to the left. These diagrams thus indicate clearly that the desired shifting of the figure will occur, but that such shifting takes place within fixed boundaries, that is the shifting of the boundaries discussed above with reference to the prior art systems does not take place.

By superposition of additional AC signals at terminal 5 of FIG. 1, new figures having shapes which were heretofore not obtainable may be created. For example, a heartshaped figure can be obtained by superimposition of parabolic and triangular shaped signals. The size and the position on the screen of such figures is adjustable by means of resistors 4 and 23.

Various changes and modifications may be made within the scope of the inventive concepts.

I claim:

1. In a method for generating control signals for wipe transitions of video signals in the form of a geometric figure at a selectable position on the screen of a cathode ray tube, wherein the shape of said geometric figure is controlled by combination of a plurality of input signal sequences each having a predetermined variation with respect to time, a process for changing said position on said screen of said geometric figure in dependence on the setting of an externally controllable adjustment element, comprising the steps of
    adding a DC signal having an adjustable amplitude to at least one of said input signal sequences; and
    varying said amplitude of said DC signals in dependence upon said setting of said adjustment element, whereby said position on said screen of said geometric figure depends upon said setting of said externally controllable adjustment element.

2. A method as set forth in claim 1, wherein said input signal sequences comprise a sequence of sawtooth signals; and wherein said DC signal is a DC voltage.

3. A method as set forth in claim 2, further comprising the step of generating horizontal and vertical synchronization signals;
    and wherein said sawtooth signals are synchronized to said horizontal synchronization signals.

4. A method as set forth in claim 2, further comprising the step of generating horizontal and vertical synchronization signals;
    and wherein said sawtooth signals are synchronized to said vertical synchronization signals.

5. A method as set forth in claim 2, further comprising the step of squaring said sawtooth signal with said added DC voltage, thereby creating a parabolic signal.

6. A method as set forth in claim 5, further comprising the step of creating a triangular signal from said sawtooth signal with said DC voltage.

7. A method as set forth in claim 5, further comprising the steps of inserting a reference level signal into said sawtooth signal, and clamping said sawtooth signal to said reference level prior to said squaring of said sawtooth signal.

8. A method as set forth in claim 6, wherein said step of creating said triangular signal comprises inverting said sawtooth signal with said added DC voltage, and nonadditively mixing said sawtooth signal with said added DC voltage and the so-inverted sawtooth signal.

9. A method as set forth in claim 1, further comprising the step of superimposing AC signals on said DC signal.

10. In a television system operative in trace and retrace intervals, said television system having a source of horizontal and vertical synchronization signals, a cathode ray tube having a screen, and means (21) for combining selected ones of a plurality of input signal sequences each having a predetermined variation with respect to time to create a control signal adapted to form a geometric figure at a selected location on said screen, comprising
    means (3, 12, 17) for creating said plurality of input signal sequences;
    means for inserting a DC signal into at least a selected one of said plurality of input signal sequences; and
    means (4) for changing the amplitude of said so-inserted DC signal until said geometric figure is at said selected location on said screen.

11. A television system as set forth in claim 10, wherein said means for creating said input, signal sequences comprises means for furnishing a sawtooth signal, means for squaring said sawtooth signal thereby creating a parabolic signal, and means for creating a triangular shaped signal from said sawtooth signal.

12. A television as set forth in claim 11, wherein said means for creating a triangular shaped signal comprises difference amplifier means (19) having a first input for receiving said sawtooth signal, a second input for receiving a constant potential and a first and second difference amplifier output, and a mixing stage (20) having inputs connected to said difference amplifier outputs and a mixing output for furnishing said triangular shaped signal.

13. A television system as set forth in claim 12, further comprising a decoupling stage interconnected between said first and second output of said difference amplifier means and said inputs of said mixing stage.

14. A television system as set forth in claim 12, wherein said mixing stage comprises a source of positive and negative voltage (32, 48), a first and second transistor (37, 38) each having an emitter, collector, and base, an emitter resistor (43) connecting said emitters of said first and second transistor to said source of positive voltage, a first and second collector resistor (39, 40) connecting said collector of said first and second transistor, respectively, to said source of negative voltage, a third and fourth transistor (44, 45) each having a collector, emitter and base, means directly connecting said collector of said third and fourth transistor to said base of said first and second trnsistor, respectively, means directly connecting said base of said third and fourth transistor directly to said emitters of said first and second transistor, respectively, and resistance means (46, 47) connecting said emitters of said third and fourth transistors to said source of negative voltage.

15. In a method for generating control signals for wipe transitions of video signals in the form of a geometric figure at a selectable position on the screen of a cathode ray tube, wherein the shape of said geometric figure is controlled by combination of a plurality of input signal sequences each having a predetermined variation with respect to time, said input signal sequences comprising a sequence of sawtooth signals, a process for changing said position on said screen of said geometric figure in dependence on the setting of an externally controllable adjustment element, comprising the steps of
    adding a DC voltage having an adjustable amplitude to said sequence of sawtooth signals; squaring said sawtooth signals with said added DC voltage, thereby creating a parabolic signal; constituting one of said input signal sequences;
    creating a triangular signal constituting another of said input signal sequences from said sawtooth signals with said DC voltage; and
    varying said amplitude of said DC voltage in dependence upon said setting of said adjustment element, whereby said position on said screen of said geometric figure changes with changes of said setting of said externally controllable adjustment element.

16. In a television system operative in trace and retrace intervals, said television system having a source of horizontal and vertical synchronization signals, a cathode ray tube having a screen, and means (21) for combining selected ones of a plurality of input signal sequences each having a predetermined variation with respect to time to create a wipe control signal adapted to form a desired geometric figure and to effect changes in the location of said figures on said screen, comprising
    means (3, 12, 17) for creating said plurality of input signal sequences;
    means for inserting a DC signal into at least a selected one of said plurality of input signal sequences;
    means (4) for changing the amplitude of the so-inserted DC signal to change the position of said geometric figure on said screen;
    wherein said means for creating said input signal sequences comprises means for furnishing a sawtooth signal, means for squaring said sawtooth signal thereby creating a parabolic signal, and means for creating a triangular shaped signal from said sawtooth signal, said means for creating a triangular shaped signal comprising difference amplifier means (19) having a first input for receiving a sawtooth signal, a second input for receiving a constant potential and a first and second difference amplifier output, and a mixing stage (20) having inputs connected to said difference amplifier outputs and a mixing output for furnishing said triangular shaped signal.

17. In a method for generating control signals for video signal wipe transitions in a television system operative at a horizontal and vertical frequency and having a cathode ray tube, wherein said wipe transition has a shape of a geometric figure movable on the screen of said cathode ray tube, and comprising the steps of
    generating a first signal sequence synchronized to said horizontal or vertical frequency;
    adding a DC signal having an adjustable amplitude to said first signal sequence, thereby creating a first input signal sequence;
    creating at least a second input signal sequence from said first input signal sequence;
    combining said first and second input signal sequence to create said control signals; and
    varying said amplitude of said DC signal to move said geometric figures on said screen.

\* \* \* \* \*